US012468328B2

(12) United States Patent
Werking

(10) Patent No.: US 12,468,328 B2
(45) Date of Patent: Nov. 11, 2025

(54) LOW NOISE BANDGAP VOLTAGE REFERENCE CIRCUITS

(71) Applicant: Honeywell International Inc., Charlotte, NC (US)

(72) Inventor: Paul M. Werking, Rockford, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/298,875

(22) Filed: Apr. 11, 2023

(65) Prior Publication Data

US 2024/0345613 A1 Oct. 17, 2024

(51) Int. Cl.

*G05F 3/20* (2006.01)
*G05F 1/575* (2006.01)
*G05F 3/26* (2006.01)
*G05F 3/30* (2006.01)

(52) U.S. Cl.

CPC .............. *G05F 3/205* (2013.01); *G05F 1/575* (2013.01); *G05F 3/267* (2013.01); *G05F 3/30* (2013.01)

(58) Field of Classification Search

None

See application file for complete search history.

(56) References Cited

U.S. PATENT DOCUMENTS 3,617,859 A 11/1971 Dobkin et al.
3,887,863 A 6/1975 Brokaw
3,916,508 A 11/1975 Conzelmann et al.
4,249,122 A * 2/1981 Widlar ...................... G05F 3/30 330/297
4,447,784 A * 5/1984 Dobkin ................... G05F 3/265 323/226
4,525,663 A 6/1985 Henry
4,902,959 A 2/1990 Brokaw
5,942,887 A 8/1999 Annema (Continued)

FOREIGN PATENT DOCUMENTS

CN 209765366 U 12/2019
CN 113271068 A 8/2021

OTHER PUBLICATIONS

Robert Keim, Applications of the Op-Amp: Voltage Follower Circuit, Sep. 20, 202, https://www.allaboutcircuits.com/video-tutorials/op-amp-applications-voltage-follower/ accessed Feb. 23, 2024 (Year: 2020).*

(Continued)

*Primary Examiner* — Thomas J. Hiltunen

(74) *Attorney, Agent, or Firm* — Shumaker & Sieffert, P.A.

(57) ABSTRACT

Voltage reference circuits configured to output reference voltages with a reduced noise on the output and reduced power consumption when compared to other arrangements of voltage reference circuits. The voltage reference circuit of this disclosure may stack two or more independent shunt voltage reference circuits in series to produce a summed voltage (Vsum), then amplify the summed voltage to output the desired reference voltage. The circuit of this disclosure may arrange the independent shunt voltage reference circuits to diminish any noise generated by each independent shunt voltage reference circuit in the summed voltage, for example as an array of independent shunt voltage reference circuits in series.

10 Claims, 10 Drawing Sheets

(56) References Cited

U.S. PATENT DOCUMENTS

| | | | | |
|---|---|---|---|---|
| 6,184,743 | B1 * | 2/2001 | Swart | G05F 3/30 323/313 |
| 6,426,669 | B1 | 7/2002 | Friedman et al. | |
| 6,522,114 | B1 * | 2/2003 | Bakker | G05F 1/467 323/282 |
| 6,528,979 | B2 * | 3/2003 | Kimura | G05F 3/30 323/907 |
| 6,529,066 | B1 | 3/2003 | Guenot et al. | |
| 6,614,209 | B1 | 9/2003 | Gregoire, Jr. | |
| 7,071,766 | B2 * | 7/2006 | Nemoto | G05F 3/16 327/539 |
| 7,103,331 | B2 | 9/2006 | Motoyama | |
| 7,122,997 | B1 | 10/2006 | Werking | |
| 7,242,240 | B2 * | 7/2007 | Gierkink | G05F 3/30 327/539 |
| 7,372,318 | B2 * | 5/2008 | Scratchley | H02M 3/07 363/59 |
| 7,583,135 | B2 * | 9/2009 | Ashburn, Jr. | G05F 3/30 327/539 |
| 7,605,578 | B2 | 10/2009 | Marinca | |
| 7,863,882 | B2 * | 1/2011 | Harvey | G05F 3/30 323/273 |
| 8,203,324 | B2 | 6/2012 | Werking | |
| 8,421,433 | B2 * | 4/2013 | Vyne | G05F 3/30 327/339 |
| 8,508,211 | B1 * | 8/2013 | Anderson | G05F 3/30 327/539 |
| 8,687,302 | B2 * | 4/2014 | Hoque | G06F 1/26 360/75 |
| 9,568,933 | B2 | 2/2017 | Pottbaecker et al. | |
| 9,600,014 | B2 * | 3/2017 | Marinca | G05F 3/30 |
| 10,095,253 | B2 * | 10/2018 | Whidden | G05F 1/577 |
| 10,845,838 | B2 * | 11/2020 | Tanikawa | G05F 1/468 |
| 11,604,487 | B2 * | 3/2023 | Marinca | G05F 3/30 |
| 2004/0108888 | A1 | 6/2004 | Nemoto | |
| 2008/0007243 | A1 * | 1/2008 | Matsumoto | G05F 3/30 323/313 |
| 2008/0079413 | A1 | 4/2008 | Ashburn et al. | |
| 2009/0058391 | A1 * | 3/2009 | Rokos | G05F 3/30 323/313 |
| 2015/0261234 | A1 * | 9/2015 | Yang | G05F 1/468 323/313 |
| 2017/0255221 | A1 | 9/2017 | Marinca et al. | |
| 2019/0020317 | A1 * | 1/2019 | Chen | H03F 3/191 |

OTHER PUBLICATIONS

"Series or Shunt Voltage Reference?", Application Note 4003, Retrieved from: https://www.maximintegrated.com/en/design/technical-documents/app-notes/4/4003.html, Mar. 19, 2007, 4 pp.

Annema, "Low-Power Bandgap References Featuring DTMOST's", vol. 34, No. 7, IEEE, Jul. 1999, pp. 949-955.

Arar, "Introduction to Bandgap Voltage References", All About Circuits, Jul. 7, 2019, 9 pp.

Banba et al., "A CMOS Bandgap Reference Circuit with Sub-1-V Operation", vol. 34, No. 5, IEEE, May 1999, pp. 670-674.

Brokaw, "A Simple Three-Terminal IC Bandgap Reference", vol. 9, No. 6, IEEE, Dec. 1974, pp. 388-393.

Brokaw, "How to Make a Bandgap Voltage Reference in One Easy Lesson", Retrieved from: https://www.renesas.com/us/en/document/whp/how-make-bandgap-voltage-reference-one-easy-lesson-paul-brokaw, 2011, 60 pp., (Applicant points out, in accordance with MPEP 609.04(a), that the year of publication, 2011, is sufficiently earlier than the effective U.S. filing date, so that the particular month of publication is not an issue.).

Chen et al., "1V CMOS current reference with 50ppm/oC temperature coefficient", vol. 39, No. 2, Electronics Letters, Jan. 23, 2003, 2 pp.

Degrauwe et al., "CMOS Voltage References Using Lateral Bipolar Transistors", vol. 20, No. 6, Dec. 1985, pp. 1151-1157.

Huffman, "Voltage Reference Circuit Collection", Linear Technology, Jun. 1991, 32 pp.

Kuijk, "A Precision Reference Voltage Source", vol. 8, No. 3, IEEE, Jun. 1973, pp. 222-226.

Leung et al., "A Sub-1-V 15-ppm/oC CMOS Bandgap Voltage Reference Without Requiring Low Threshold Voltage Device", vol. 37, No. 4, Apr. 2002, pp. 526-530.

Meijer et al., "An Integrated Bandgap Reference", vol. 11, No. 3, Jun. 1976, pp. 403-406.

Opensystems Media, "Shunt versus series: How to select a voltage-reference topology", Maxim, Jun. 24, 2015, 12 pp.

Shah, "Why Does Voltage Reference Noise Matter?", vol. 54, No. 2, Electronic Design, May 14, 2020, 26 pp.

Vittoz, "MOS Transistors Operated in the Lateral Bipolar Mode and Their Application in CMOS Technology", vol. 18, No. 3, IEEE, Jun. 1983, pp. 273-279.

Widlar, "New Developments in IC Voltage Regulators", vol. 6, No. 1, IEEE, Feb. 1971, pp. 2-7.

Extended Search Report from counterpart European Application No. 24164178.6 dated Oct. 7, 2024, 11 pp.

Response to Extended Search Report dated Oct. 7, 2024, from counterpart European Application No. 24164178.6 filed Apr. 22, 2025, 21 pp.

* cited by examiner

LOW NOISE BANDGAP VOLTAGE REFERENCE CIRCUITS

TECHNICAL FIELD

The disclosure relates to voltage reference circuits.

BACKGROUND

Bandgap voltage reference circuits are part of many analog and mixed-signal integrated circuits. Bandgap voltage reference circuits may be arranged to provide a temperature independent output reference voltage.

SUMMARY

In general, the disclosure describes voltage reference circuits configured to output voltages of less than approximately twenty volts. Above this voltage one would commonly use either Zener or avalanche diodes. However, the techniques disclosed here could also be used with Zener and avalanche diodes to reduce the noise of higher voltage references and regulators. These techniques also reduce power consumption when compared to other arrangements of low noise voltage reference circuits. The voltage reference circuit of this disclosure may stack two or more independent shunt voltage reference circuits in series to produce a summed voltage (Vsum), then amplify the summed voltage to output the desired reference voltage. The circuit of this disclosure may arrange the independent shunt voltage reference circuits to diminish the noise generated by the overall voltage reference circuit. The arrangement of this disclosure also may diminish any noise in the amplified output of the summed voltage. Also, the arrangement of the independent shunt voltage reference circuits may consume less power when compared to other voltage reference circuit arrangements. In some applications, especially sensor applications, the noise of the bandgap voltage reference used can limit system performance. This disclosure presents several methods of reducing the noise of bandgap voltage references and regulators while minimizing the power and area consumed by these circuits.

In one example, this disclosure describes a circuit comprising an amplifier circuit comprising an output terminal configured to provide a voltage output; and an input terminal; a first shunt voltage reference circuit and a second shunt voltage reference circuit, wherein the first shunt voltage reference circuit includes a first low terminal and a first high terminal, wherein the second shut voltage reference circuit includes a second low terminal and second high terminal, wherein the first shunt voltage reference circuit connects in series with the second shunt voltage reference circuit such that the second high terminal connects to the first low terminal, wherein the first high terminal connects to the input terminal of the amplifier circuit.

The details of one or more examples of the disclosure are set forth in the accompanying drawings and the description below. Other features, objects, and advantages of the disclosure will be apparent from the description and drawings, and from the claims.

DETAILED DESCRIPTION

The disclosure describes voltage reference circuits configured to output reference voltages with a reduced noise on the output and reduced power consumption when compared to other arrangements of low noise voltage reference circuits. The voltage reference circuit of this disclosure may stack two or more independent shunt voltage reference circuits in series to produce a summed voltage (Vsum), then either amplify or attenuate the summed voltage, if needed, to output the desired reference voltage. In some examples the independent shunt voltage reference circuits may include temperature independent bandgap voltage reference circuits.

Applications for which the voltage reference circuits of this disclosure may be desirable include Microelectromechanical system (MEMS) sensors, such as accelerometers, gyroscopes, and similar sensors. Because of the physics of the electrostatic fields involved, it may not be possible to reduce the bias voltages driving MEMS sensors, nor the sensor output voltages, even when the physical dimensions of the sensor may be reduced. Therefore, most MEMS sensors may operate at voltages of about 5V to 20V and may continue to do so for the foreseeable future. Other example applications may also include quantum computing where similar voltages are required and low noise is desirable for maintaining the lifetime of the "qubits" at the heart of the computer.

In sensor circuits, the noise of the voltage references supporting the sensor circuits may limit the sensitivity and/or precision of the sensor. In MEMS sensors, for example, noise may reduce sensor performance in two ways. First, by adding noise to a bias reference (either AC or DC) used by the sensor, which is then coupled to the sensor output. Second, by adding noise to the reference used by the analog-to-digital converter (ADC) used to capture the sensor signal output, small errors may appear in the converted digital quantity which may also limit sensitivity and resolution.

The circuit of this disclosure address these challenges and may arrange the independent shunt voltage reference circuits to diminish any noise generated by each independent shunt voltage reference circuit in the summed voltage. Therefore, the arrangement of this disclosure also may diminish any noise in the amplified output of the summed voltage.

Some examples of techniques to reduce reference noise voltages generally require large current consumption so that these voltage reference circuits consume more power than the rest of the MEMS sensor circuit. In contrast, the arrangement of the independent shunt voltage reference circuits of this disclosure may consume less power when compared to these other voltage reference circuit arrangements.

Figure 1:
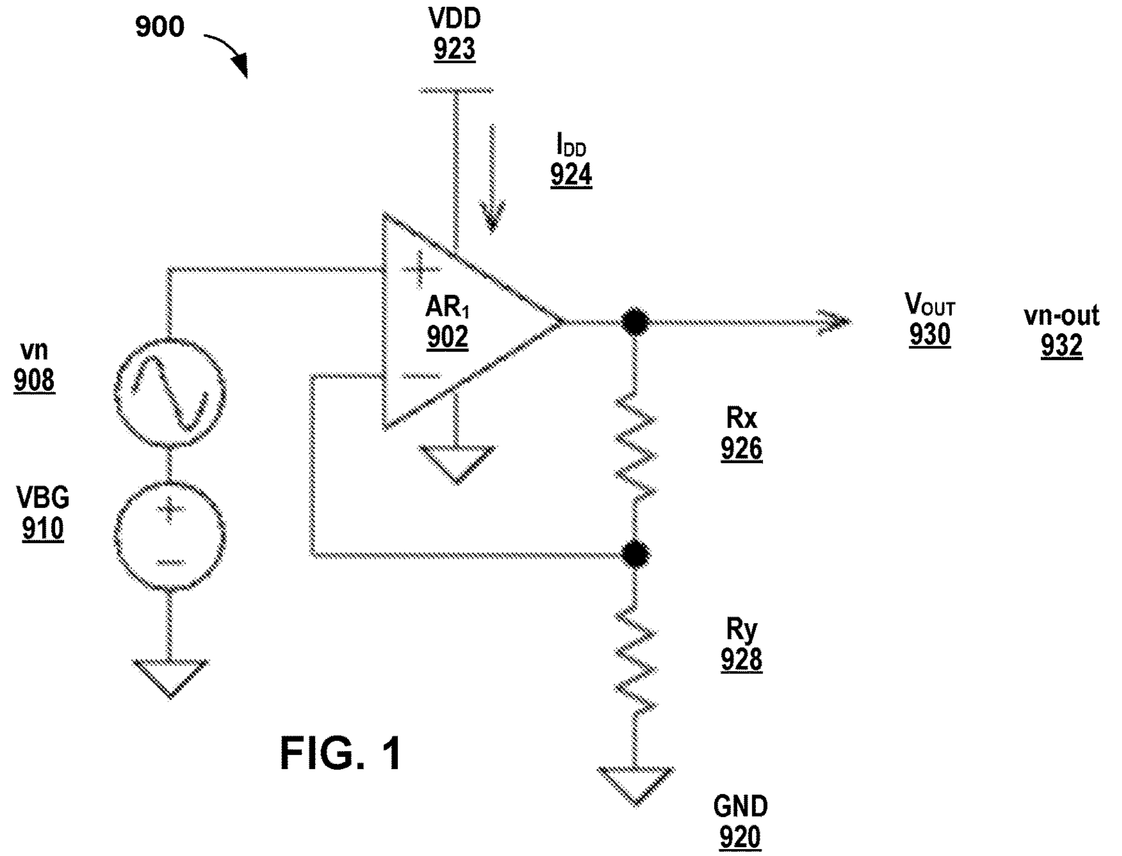
FIG. 1 is a schematic diagram illustrating an example voltage reference circuit with a single bandgap voltage reference and an associated noise source.

FIG. 1 is a schematic diagram illustrating an example voltage reference circuit with a single bandgap voltage reference and an associated noise source. In the example of circuit 900 of FIG. 1, VBG 910 represents the temperature stable DC voltage supplied by the bandgap voltage reference and vn 908 represents the equivalent AC noise voltage of this reference. These voltages are then amplified by ideal noiseless op amp, AR1 902, which provides a positive closed-loop gain of Av=(1+RX/RY) set by resistors 926 and 928. This overall circuit supplies a DC output voltage, Vout 930, and an equivalent output noise voltage, vn-out 932, as specified below.

$$VOUT = Av * VBG \tag{1}$$

$$vnout = Av * vn \tag{2}$$

These equations assume that the noise contributions of the amplifier and the resistors are insignificant. To provide a 5V output voltage (Vout 930) from a 1.25V bandgap voltage reference (VBG 910) having a noise voltage (vn 908), for example, of 10 uVrms, circuit 900 uses amplification. Setting the value of RX-3*RY produces a voltage gain of four (Av=1+3=4) to achieve the desired output voltage of 5V. However, vn 908 is also amplified by Av=4 so that vn-out 932 becomes 40 uVrms.

Figure 2:
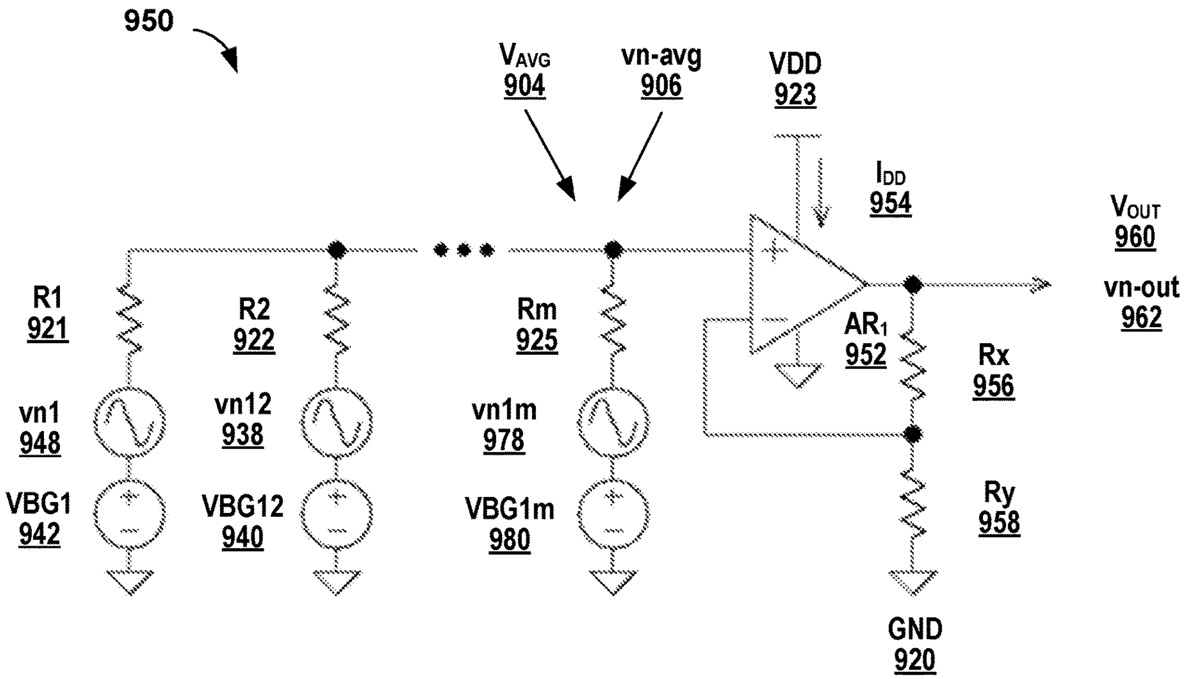
FIG. 2 is a schematic diagram that illustrates one technique to reduce output noise for a bandgap voltage reference.

FIG. 2 is a schematic diagram that illustrates one technique to reduce output noise for a bandgap voltage reference. In the example of circuit 950, the outputs of several independent bandgap voltage references may be combined. In this circuit, there are an integer number of bandgap voltage references (m) connect together by m resistors. Each of resistors R1 921, R2 922 through Rm 925 has the same value so that the DC output of the network of bandgap references, VAVG 904, is the average of the m voltage references, e.g., $$VAVG = (VBG1 + VBG2 + \ldots + VBGm)/m \tag{3}$$

As also described below for FIG. 3, when all voltage references have roughly the same value (or at least the same average value), VBG, equation 3 reduces to the following equation and the output voltage is the same as before.

$$VAVG = VBG \tag{4}$$

$$VOUT = Av * VBG \tag{5}$$

By keeping the values of the m resistors low enough, the resistors do not contribute significantly to the output noise of the network, vn-avg 906, which is equal to the square root of the sum of each noise source squared, divided by m. (This is the same as the statistical average of the noise powers.)

$$vnavg = SqrRoot(vn1^2 + vn2^2 + \ldots + vnm^2)/m \tag{6}$$

As noted above, when all voltage references have the same average noise voltage, vn, this reduces to the following and the output noise voltage is reduced accordingly.

$$vnavg = vn/SqrRoot(m) \tag{7}$$

$$vnout = Av * vn/SqrRoot(m) \tag{8}$$

When compared to circuit 900 of FIG. 1, using four independent bandgap voltage references may reduce the output noise by a factor of ½, e.g., to 20 μVrms. In another example, setting m=16, and using 16 independent bandgap voltage references, the output noise may be reduced by a factor of ¼ to 10 μVrms. This counteracts the noise gain of the amplifier, Av=4. However, adding additional voltage references in this manner may significantly increase overall power consumption. This is because each bandgap voltage reference would have about the same DC current consumption as for amplifier AR1 952, e.g., IDD 954. Staying with this numerical example, circuit 900 may have an overall current consumption of 2*IDD, while circuit 950 may have a current consumption of either 5*IDD or 17*IDD in the examples where m equals 4 and 16 respectively. In other words, these two examples may cause either a 2.5× (5/2) or an 8.5× (17/2) increase in power dissipation if it is assumed that all circuits work from the same supply voltage, VDD 923.

Figure 3:
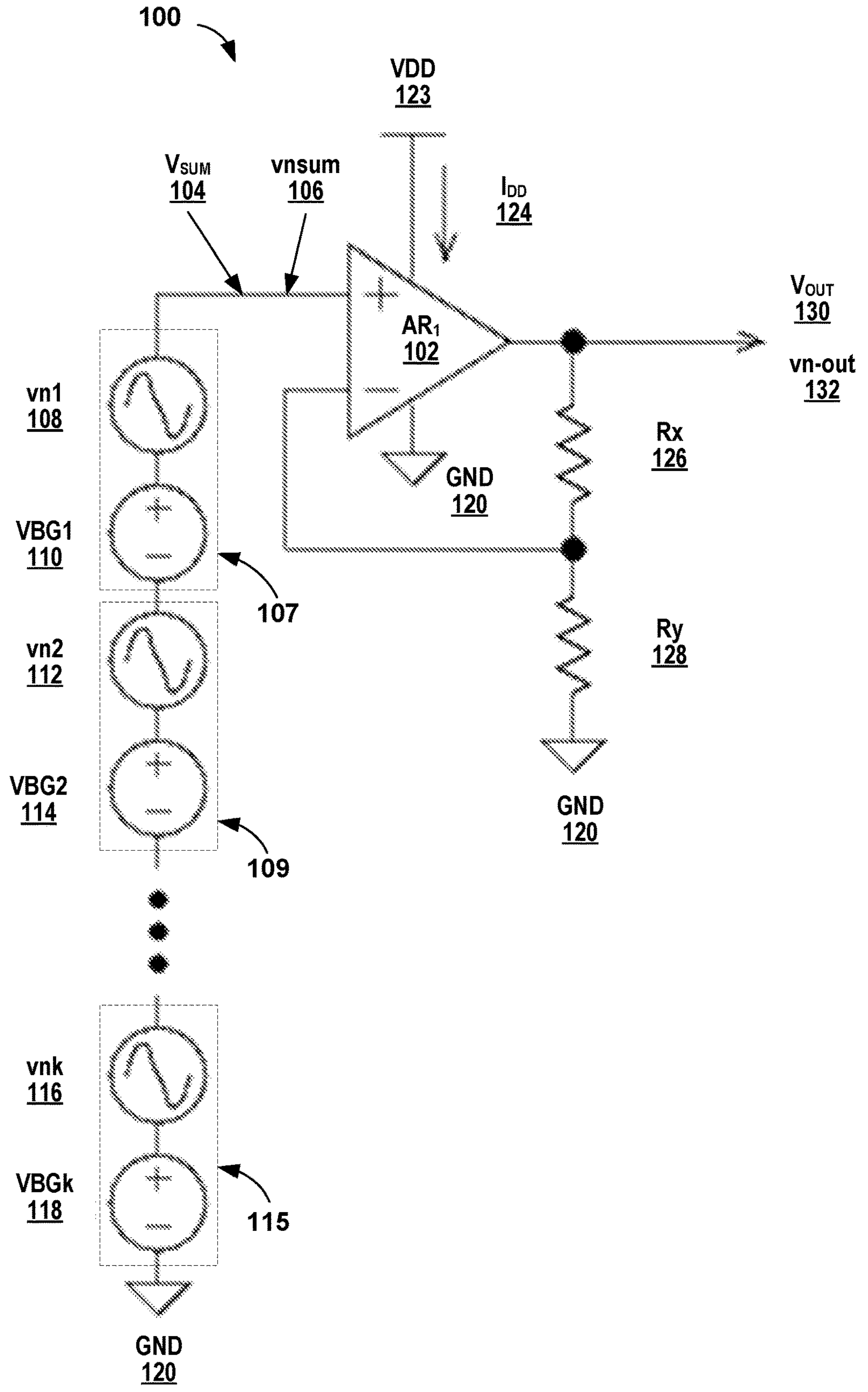
FIG. 3 is a schematic diagram illustrating an example voltage reference circuit including independent shunt voltage reference circuits in series.

FIG. 3 is a schematic diagram illustrating an example voltage reference circuit including independent shunt voltage reference circuits in series. Circuit 900 of FIG. 1 is similar, but with k=1. In the example of circuit 100, VBG, e.g., VBG1 110, represents a temperature stable DC voltage supplied by the bandgap voltage reference and vn, e.g., vn1 108, represents the equivalent AC noise voltage of this reference. The series arrangement includes an integer number, k, of independent bandgap voltage references, 107-115, are connected in series. The circuit arrangement results in the DC and noise voltages being summed at the non-inverting input to amplifier AR1 102, to provide VSUM 104 and vnsum 106 per the equations below:

$$VSUM = VBG1 + VBG2 + \ldots + VBGk \tag{9}$$

$$vnsum = SqrRoot(Vn1^2 + Vn2^2 + \ldots + Vnk^2) \tag{10}$$

Ideal noiseless op amp, AR1 102, which provides a positive closed-loop gain of Av=(1+RX/RY) amplifies the two summed voltages to provide the DC output voltage, VOUT, and equivalent output noise voltage, vnout, per the following equations:

$$VOUT = Av * (VBG1 + VBG2 + \ldots + VBGk) \quad (11)$$

$$vn\text{-out} = Av * SqrRoot(Vn1^2 + Vn2^2 + \ldots + Vnk^2) \quad (12)$$

In these equations, it is assumed that the noise contributions of the amplifier and the resistors are insignificant.

In more detail, the output terminal of amplifier AR1 102 provides Vout 130, as well as vn-out 132 in the example of circuit 100. The output voltage, Vout 130 is fed back to the inverting input of AR1 102 through a resistor divider including resistors Rx 126 and Ry 128. A first terminal of Rx 126 connects to the output terminal of AR1 102, and the series arrangement of Rx 126 and Ry 128 connect the output terminal of AR1 102 to ground, GND 120. The node between Rx 126 and Ry 128 connects to the inverting terminal of AR1 102. Note that in this disclosure, GND 120 may be, for example, a circuit ground, a system ground, a layer in an integrated circuit, or some reference voltage, e.g., a voltage source opposite in polarity from Vdd 123, but GND 120 will be referred to as GND 120 to simplify the description of the circuits of this disclosure.

In some examples, amplifier AR1 102 may be implemented as an operational transconductance amplifier (OTA). AR1 102 also connects to Vdd 123 and to GND 120. The series arrangement of independent bandgap voltage reference circuits 107, 109 and 115 form a string of voltage references to provide Vsum 104. The voltage reference circuits in the example of circuit 100 are described as bandgap voltage references, however, the voltage reference circuit of this disclosure may also be implemented using any shunt voltage reference.

In the example of circuit 100, independent bandgap voltage reference 107 connects to the non-inverting input of AR1 102. Independent bandgap voltage reference 107 includes VBG1 110, the bandgap voltage reference, and an associated AC noise source vn1 108. In the example of circuit 100, the positive terminal of VB1 110 connects to the positive terminal of AR1 102 through noise source vn1 108. However, in other examples, VBG1 110 and vn1 108 may connect in either series order. Independent bandgap voltage reference 109, which includes VBG2 114 and vn2 112, connects to independent bandgap voltage reference 107, as well as to the other k voltage references in the series down to independent bandgap voltage reference 115, which includes VBGk 118 and vnk 116.

To simplify the description, assume all bandgap voltage references of circuit 100 have the same DC voltage, VBG, and the same noise voltage, vn. Then equations (9)-(12) may be simplified as follows:

$$VOUT = Av * k * VBG \quad (13)$$

$$vn\text{-out} = Av * SqrRoot(k) * vn \quad (14)$$

Note that circuit 100 has no averaging resistors that could possibly increase the output noise level if the resistance values were large. The series arrangement that results in Vsum 104 means the gain for amplifier AR1 102 may only be enough to provide Vout 130 to be at the desired magnitude. In some examples the maximum value of gain needed by this circuit is as follows, where k is any positive integer.

$$Av < 1 + (1/k) \quad (15)$$

Because any gain in AR1 102 also amplifies the noise vn-sum 106, then a voltage reference circuit with a reduced amplifier gain may result in reduced noise vn-out 132, when compared to circuits with higher gain amplifiers. The value of Rx 126 and Ry 128 may set the gain, Av for amplifier AR1 102. For example, setting the value of RX=3*RY produces a voltage gain of four (Av=1+3=4). However, vn is also amplified by Av=4. For circuit 100, if more gain is needed then k may be increased by adding another series bandgap voltage reference. In principle, circuit 100 may produce any arbitrary output voltage, VOUT 130, greater than the magnitude of voltage output from each independent bandgap voltage references, e.g., VBG. In some examples, such precision for a voltage reference may not be necessary and the amplifier circuit, AR1 102, may be omitted altogether (not shown in FIG. 3).

The utility of circuit 100 may be shown by the following numerical example. Consider a goal of providing a 5V voltage reference output using bandgap references with each output voltage VBG=1.25V and each having vn=10 uVrms of noise. By placing four bandgap references in series (k=4), the output voltage becomes 5V (VOUT=1*4*1.25V) when Av=1, and output noise voltage becomes 20 uVrms (vnout=1*2*10 uVrms), by applying equations (13) and (14). The stacked (series) arrangement reduces the noise contribution at vn-out 132 by less than a simple sum of the noise voltage contributions (Vn1 108, vn2 112 . . . vnk 116).

Also, in circuit 100, all four shunt bandgap voltage references share the same supply current. Assume that the current to the series arrangement (string) of independent bandgap voltage references is equal to the op amp supply current, IDD 124. Therefore, the total supply current to circuit 100 becomes 2*IDD which is significantly less than the supply current needed in other examples. In essence, circuit 100 may be desirable over other examples because the required gain decreases faster (1/k) with the ratio of VOUT/VBG than the noise increases (square root of k). Thus, the circuit of FIG. 3, with the series combination of voltage reference circuits, provides the same 5V reference as circuit 900, but with reduced noise.

Figure 4:
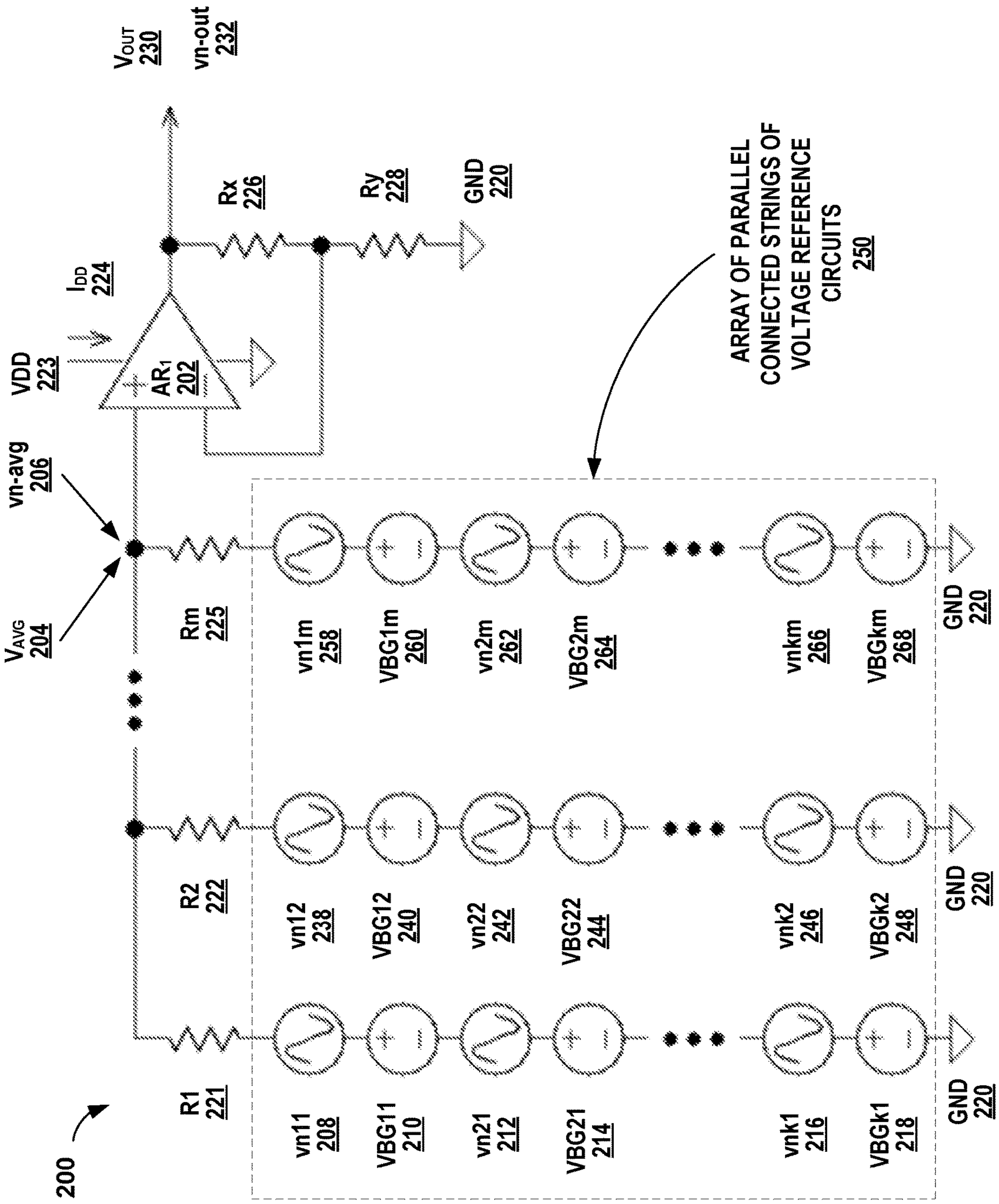
FIG. 4 is a schematic diagram illustrating an example voltage reference circuit including an array of independent shunt voltage reference circuits in series.

FIG. 4 is a schematic diagram illustrating an example voltage reference circuit including an array of independent shunt voltage reference circuits in series. Circuit 200 in the example of FIG. 4 includes of an array of m parallel connected strings of series-connected bandgap references, each string having k references. Each string connects to the non-inverting input of amplifier AR1 202 through a respective averaging resistor, R1 221-Rm 225. In the example of circuit 200, each resistor, R1 221-Rm 225, has the same value so that the DC output of the network, VAVG 204, is the average of the m voltage references.

$$VAVG = (VBG1 + VBG2 + \ldots + VBGm)/m \quad (16)$$

As described above in relation to FIG. 1, if these bandgap voltage references all have the same DC value, VBG, then the DC output voltage is the same as equation 13 described above in relation to FIG. 3:

$$VOUT = Av*k*VBG \tag{17}$$

By selecting low enough values for the m resistors, resistors R1 221-Rm 225, they may not contribute significantly to the output noise of the network, vn-avg 206, which is equal to the square root of the sum of each noise source squared, divided by m. (This is the same as the statistical average of the noise powers.)

$$vn\text{-avg} = SqrRoot(vn1^2 + vn2^2 + \ldots + vnm^2)/m \tag{18}$$

If all voltage references have the same average noise voltage, vn, the noise equation may be simplified to the following and the output noise voltage, vn-out 232 is reduced accordingly.

$$vn\text{-avg} = vn*SqrRoot(k)/SqrRoot(m) \tag{19}$$

$$vn\text{-out} = Av*vn*SqrRoot(k)/SqrRoot(m) \tag{20}$$

In the example of circuit 200 implemented in an integrated circuit, then for a given manufacturing process run, the bandgap voltage references, and the average noise voltage associated with each bandgap voltage reference, may be approximately the same. In this disclosure, "approximately the same" or "approximately equal" means that values are equal, within manufacturing and measurement tolerances. Process variation may mean that from wafer to wafer, or even for different locations on a same wafer, the values (voltage, current, resistance and other values) for different circuits may not be precisely equal to each other, however, within a circuit, such as circuit 200, the bandgap voltage references, and the average noise voltage associated with each bandgap voltage reference, may be approximately the same. As one example, for the silicon-on-insulator (SOI) process, bandgap references may be considered "approximately equal" when the output voltages are within 5% of each other. Other manufacturing processes may have values in the range of ±20%. This definition of approximately may similarly apply to other values in this disclosure, e.g., to resistor values, voltage drop and other values.

The array 250 of parallel connected strings of series-connected bandgap references, includes a first string connected to the Vavg 204 node through resistor R1 221. The first string, as well as the other strings of series-connected bandgap references, is the same as the series arrangement of k independent bandgap voltage references, 107-115, described above in relation to FIG. 3, and may have the same or similar characteristics and functions. The first string includes bandgap voltage references VBG11 210, VBG21 214 through VBGk1 218, each connected in series such that the voltage value for each reference adds together at resistor R1 221. Each of bandgap voltage references VBG11 210, VBG21 214 through VBGk1 218 has an associated noise source vn11 208, vn21 212 through vnk1 216 in series with each bandgap voltage reference that may add an AC noise to the voltage output at R1 221.

Similarly, the second string through the mth string are arranged the same as the first string. The second string includes bandgap voltage references VBG12 240, VBG22 244 through VBGk2 248, each connected in series such that the voltage value for each reference adds together at resistor R1 222. Each of bandgap voltage references VBG12 240, VBG22 244 through VBGk2 248 has an associated noise source vn12 238, vn22 242 through vnk2 246 in series with each bandgap voltage reference. The mth string includes bandgap voltage references VBG1*m* 260, VBG2*m* 264 through VBGkm 268, each connected in series such that the voltage value for each reference adds together at resistor R1 225. Each of bandgap voltage references VBG1*m* 260, VBG2*m* 264 through VBGkm 268 has an associated noise source vn1*m* 258, vn2*m* 262 through vnkm 266 in series with each bandgap voltage reference. Each of the first string, second string and through mth string also connect to between ground, GND 220 and the respective averaging resistor to the non-inverting input of amplifier AR1 202.

As described above in relation to FIG. 3, the output terminal of amplifier AR1 202 provides Vout 230, as well as vn-out 232 in the example of circuit 200. The output voltage, Vout 230 is fed back to the inverting input of AR1 202 through a resistor divider including resistors Rx 226 and Ry 228. A first terminal of Rx 226 connects to the output terminal of AR1 202, and the series arrangement of Rx 226 and Ry 228 connect the output terminal of AR1 202 to ground, GND 220. The node between Rx 226 and Ry 228 connects to the inverting terminal of AR1 202. As with circuit 100, the value of Rx 226 and Ry 228 may set the amplifier gain. AR1 202 also connects to Vdd 223 and to GND 220 and may have the same or similar functions and characteristics of amplifier AR1 102 described above in relation to FIG. 3.

Now apply a similar numerical example as for FIG. 3 for a voltage reference circuit using the arrangement of circuit 200 configured for a 5V output using 1.25V references (VBG). By placing four bandgap references in series (k=4), the output voltage again becomes 5V (VOUT=1*4*1.25V) when Av=1. Then, by also averaging four of these strings together (m=4), the output noise voltage becomes 10 uVrms (e.g., vnout=1*(2/2)*10 uVrms). When compared to circuit 100 of FIG. 3, circuit 200 reduces the noise for the same output voltage. As with the example of FIG. 3, assuming each string consumes about same current as the amplifier, the total power consumption of circuit 200 is about five times IDD 224.

Circuit 200 of FIG. 4 reduced the noise by the same amount as for circuit 950 of FIG. 2, by using 16 independent bandgap voltage references. However, with the arrangement of FIG. 4, e.g., the array of m parallel connected strings of series-connected bandgap references, each string having k references, the power consumed by circuit 200 is significantly less: 5*IDD rather than 17*IDD (a 3.4× difference or about a 70.6% decrease), when compared to circuit 950.

Figure 5:
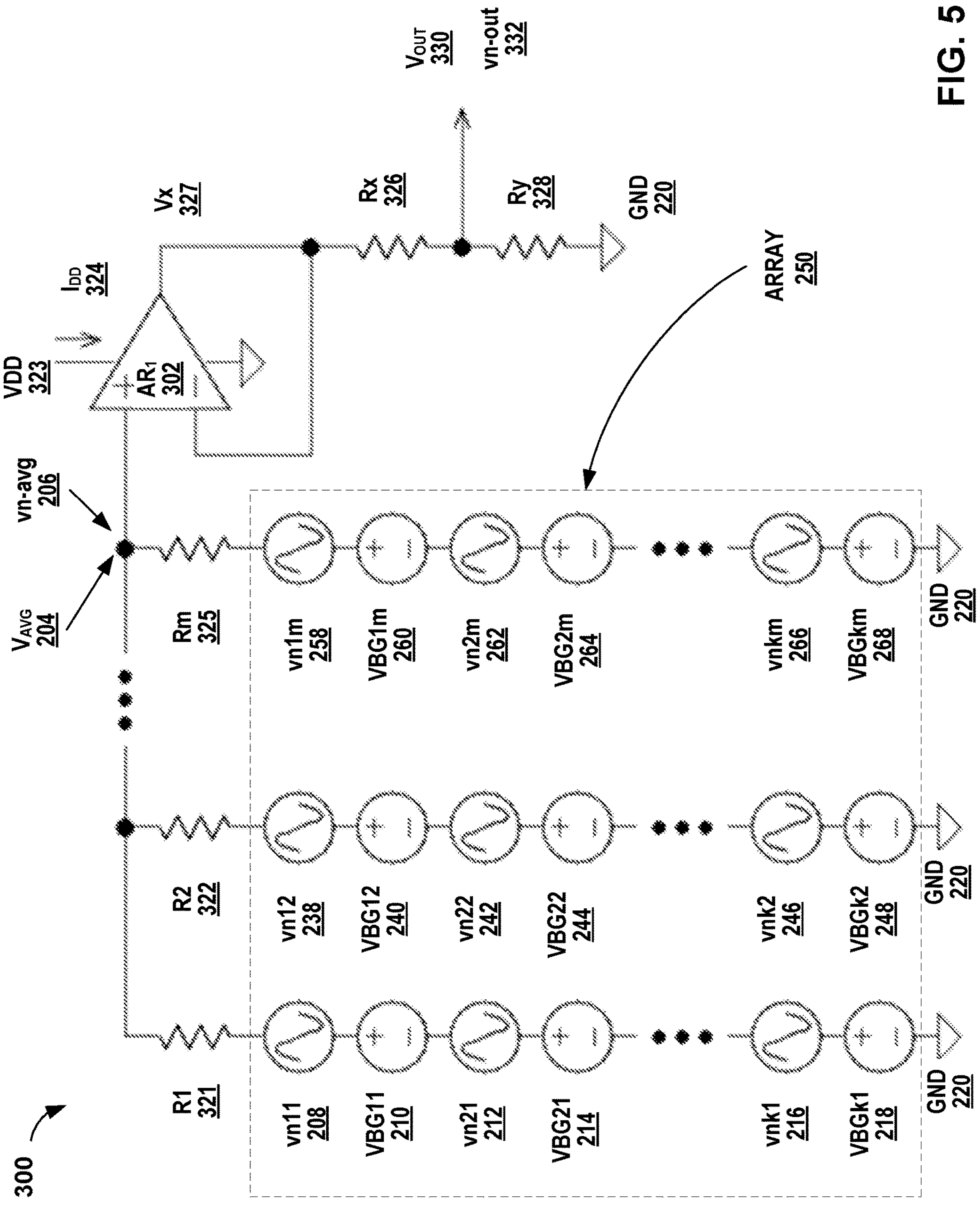
FIG. 5 is a schematic diagram of an example voltage reference circuit according to this disclosure that may be useful when the average bandgap voltage, $V_{AVG}$ is larger than the desired output reference voltage.

FIG. 5 is a schematic diagram of an example voltage reference circuit according to this disclosure that may be useful when the average voltage, $V_{AVG}$ 204, is larger than the desired output reference voltage, $V_{OUT}$ 330. Often, VDD 323, is not much greater than the desired output voltage, $V_{OUT}$ 330. However, in some applications, the VDD 323 voltage may be significantly greater (2× to 4×, or more) than the required output voltage, for example a 15V system that uses a 5V reference voltage. In such situations, the arrangement of circuit 300 may reduce noise even further than the previous circuits described above.

Circuit 300 uses the same array 250 of parallel connected strings of series-connected bandgap references connected between ground, GND 220 and the respective averaging resistor, R1 321, R2 322 through Rm 325, to the non-inverting input of amplifier AR1 302. Array 250 has the same characteristics and functions as array 250 described above in relation to FIG. 4. Vavg 204 and vn-avg 206 are also the same as described above in relation to FIG. 4. Vavg 204 connects to the non-inverting input of amplifier AR1 302.

In contrast to FIGS. 3 and 4. Vout 330, and the associated noise output vn-out 332, is at the node between resistor divider Rx 326 and Ry 328. The output of amplifier AR1 302, Vx 327 connects to the inverting input of AR1 302. Vx 327 also connects to GND 220 through the series arrangement of Rx 326 and Ry 328.

As shown in FIG. 5, the value of voltage gain in this circuit is less than unity. 0<Av<1, which allows for higher k values and greater reductions in noise. In FIG. 5, the amplifier AR1 302 is configured as a unity gain buffer and its output, VX 327, is divided by the RX−RY resistive divider so the voltage gain follows the expression below:

$$Av = VOUT / VAVG = RY / (RX + RY) \tag{21}$$

Accordingly, VOUT 330 and vn-out 332 may be calculated as follows when the average value of all bandgap voltage references equals VBG and all bandgap voltage references have the same noise, vn, described above in relation to FIGS. 3 and 4:

$$VOUT = Av * k * VBG \tag{22}$$

$$vn\text{−out} = Av * SqrRoot(k / m) * vn \tag{23}$$

Note that equations 22 and 23 are essentially the same as those used to describe circuit 200 of FIG. 4 above, e.g., equations (13) and (20). A difference between FIGS. 2 and 3 is that the voltage gain is now less than or equal to unity, whereas before it was greater than or equal to unity.

A numerical example of a desired 5V reference voltage circuit implemented with the output arrangement of FIG. 5 and m=1, with sixteen bandgap voltage references in series, e.g., k=16 would result in a single string, or row, of band gap references, similar to the arrangement of circuit 100 shown in FIG. 3. As described above, assuming VBG for silicon, VBG=1.25V, such an arrangement may produce an output of VX 327=20V, while consuming 2*IDD, e.g., about twice Idd 324. To produce the desired 5V output, VOUT 330=5V, the voltage gain, Av, may be set to ¼, accomplished by setting RX=3*RY. For an example in which the noise sources output an average vn=10 microvolts rms (μVrms), the output noise is 10 μVrms according to:

$$vnout = (1/4)\, SqrRoot(16/1) * vn = (4/4)\, 10uVrms = 10uVrms$$

In another example, where k=8, m=2, VBG=1.25V, VOUT=5V, VDD=12V, and vn=10 μVrms. This circuit arrangement of circuit 300 still contains 16 bandgap voltage references. The output of AR1 302 VX 327 is 10V, so to set Vout 330 to five volts, then Av=½, which would produce 10 μVrms of output noise, vn-out 332 according to:

$$Vn\text{−out} = (1/2)\, SqrRoot(8/2) * vn = (2/2)\, 10\mu Vrms = 10\mu\ Vrms$$

Circuit 300, with m=2 would consume 3*IDD and the relative power consumed is only 6*PX, according to:

$$Power = 2 * VDD * 3 * IDD = 6 * (VDD * IDD) = 6 * PX$$

The utility of the circuits of this disclosure is that the circuits allow the full use of the available supply voltage to minimize both output noise and power consumption.

The numerical example using circuit 300 also produced the same reduced amount of output noise produced by circuit 950 with m=16. However, circuit 300 uses much less current: 2*IDD rather than 17*IDD (an 8.5× difference). Even if one accounts for an increased supply voltage for circuit 300, the circuit still consumes less than half of the power of circuit 950. For the sake of comparison, assume that VDD 923=6V for circuit 950 and that VDD 323=24V for circuit 300. Therefore, to calculate VDD 323=4*VDD 923 and the corresponding power consumptions as follows.

$$P(\text{circuit 950}) = VDD2 * 17 * IDD = 17 * PX$$

and $$P(\text{circuit 300}) = 4 * VDD2 * 2 * IDD = 8 * PX,$$

where $$PX = VDD * IDD.$$

Figure 6:
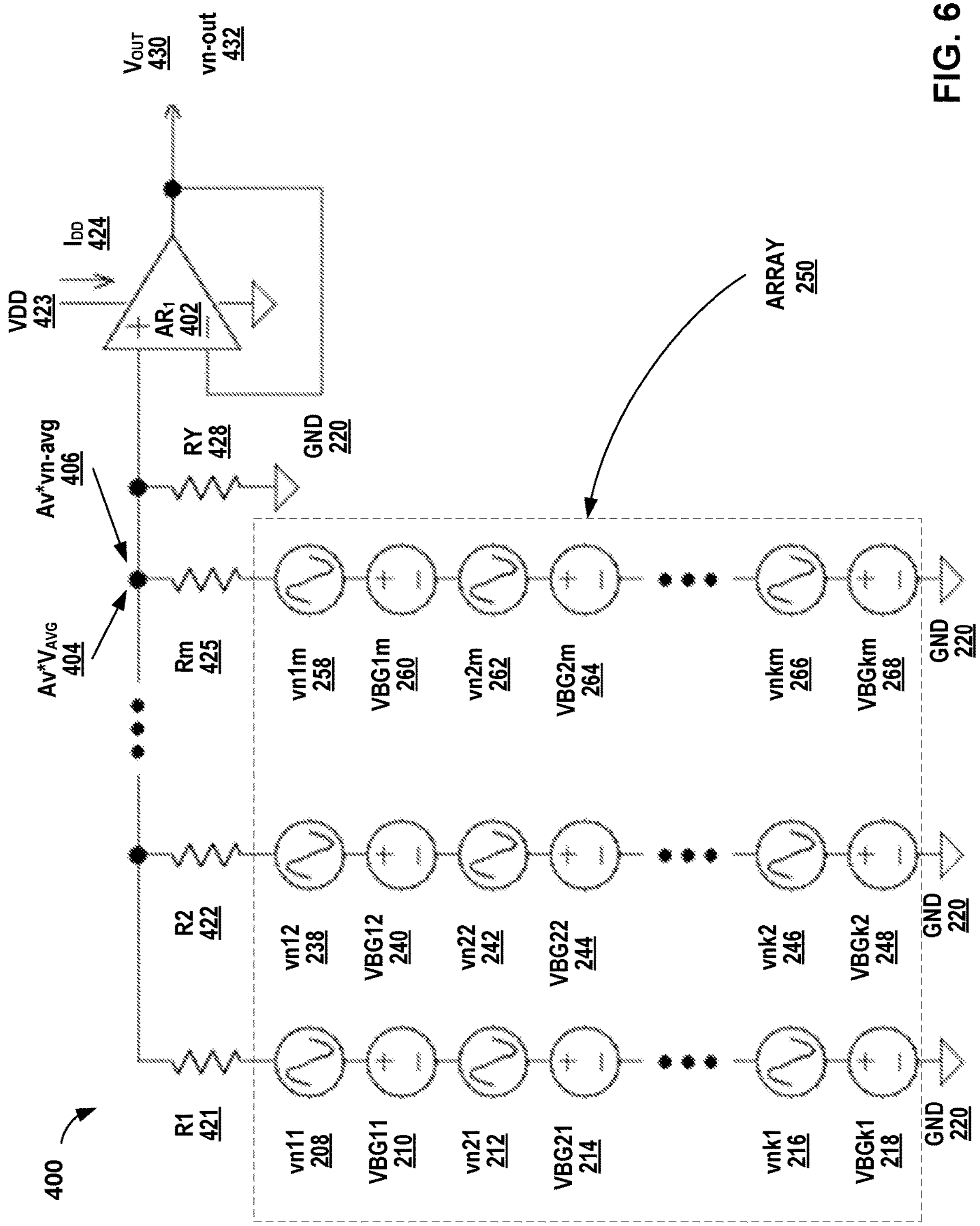
FIG. 6 is a schematic diagram of an example voltage reference circuit according to this disclosure where the voltage divider is at the input to the amplifier.

FIG. 6 is a schematic diagram of an example voltage reference circuit according to this disclosure where the voltage divider is at the input to the amplifier. Circuit 400, in the example of FIG. 6, is functionally the same as circuit 300 of FIG. 6 and follows the same equations. However, moving the voltage divider to the op amp input, allows the output, Vout 430, of amplifier AR1 402 to drive a larger load.

Similar to circuit 300 described above in relation to FIG. 5, circuit 400 may also use the same array 250 of parallel connected strings of series-connected bandgap references connected between ground, GND 220 and the respective averaging resistor, R1 421, R2 422 through Rm 425, to the non-inverting input of amplifier AR1 402. Array 250 has the same characteristics and functions as array 250 described above in relation to FIGS. 4 and 5. The node for Av*Vavg 404 and Av*vn-avg 406 connects to the non-inverting input of amplifier AR1 402. RY 428 also connects the non-inverting input for AR1 402 to ground. The resistor value for RY 428 is not necessarily the same as the resistor value for R1 421 through Rm 425.

By defining RX. e.g., RX 326 of FIG. 5, to be the parallel combination of R1-Rm (i.e., RX=R1/m, when all the averaging resistors are approximately equal) it is still possible to use equation 21, described above for FIG. 5, to determine voltage gain, Av.

$$Av = VOUT / (k * VBG) = RY / (RX + RY) \tag{24}$$

$$Av = VOUT / VAVG = RY / (RX + RY) \tag{21}$$

VOUT 430 and vn-out 432 for this circuit are still defined by equations 22 and 23 described above for circuit 300. Note that amplifier AR1 may be omitted if it is not used to drive a large load in a specific application.

This voltage reference noise reduction technique of any circuit of this disclosure may be implemented as a sub-circuit on larger integrated circuit (IC). However, the techniques of this disclosure may also be implemented as an array of discrete voltage reference ICs on a printed circuit board or larger assembly. Any silicon (Si) process could also be used to implement this technique. In fact, any number of non-silicon semi-conducting materials could be used to implement this technique.

In addition, a large number of circuit topologies may be used to implement this technique. Circuit topologies from Widlar, Dobkin, Kuijk, Brokaw, Henry, Degrauwe, Annema, Friedman, Guenot, Werking, and many others may be used as the basic sub-circuit in the bandgap circuit array of this invention. The type of bandgap sub-circuit used is not material to this invention. As described above in relation to FIG. 3, any bandgap circuit topology may be used just as long it has a shunt configuration. In some examples, a desirable shunt voltage reference may have a relatively small voltage compared to the output voltage. A shunt reference may have two terminals, e.g., OUT (high terminal) and GND (low terminal) and may be considered similar in concept to a Zener diode or simply an ideal voltage source that maintains a constant voltage between the OUT and GND terminals regardless of the current through the reference.

Figure 7:
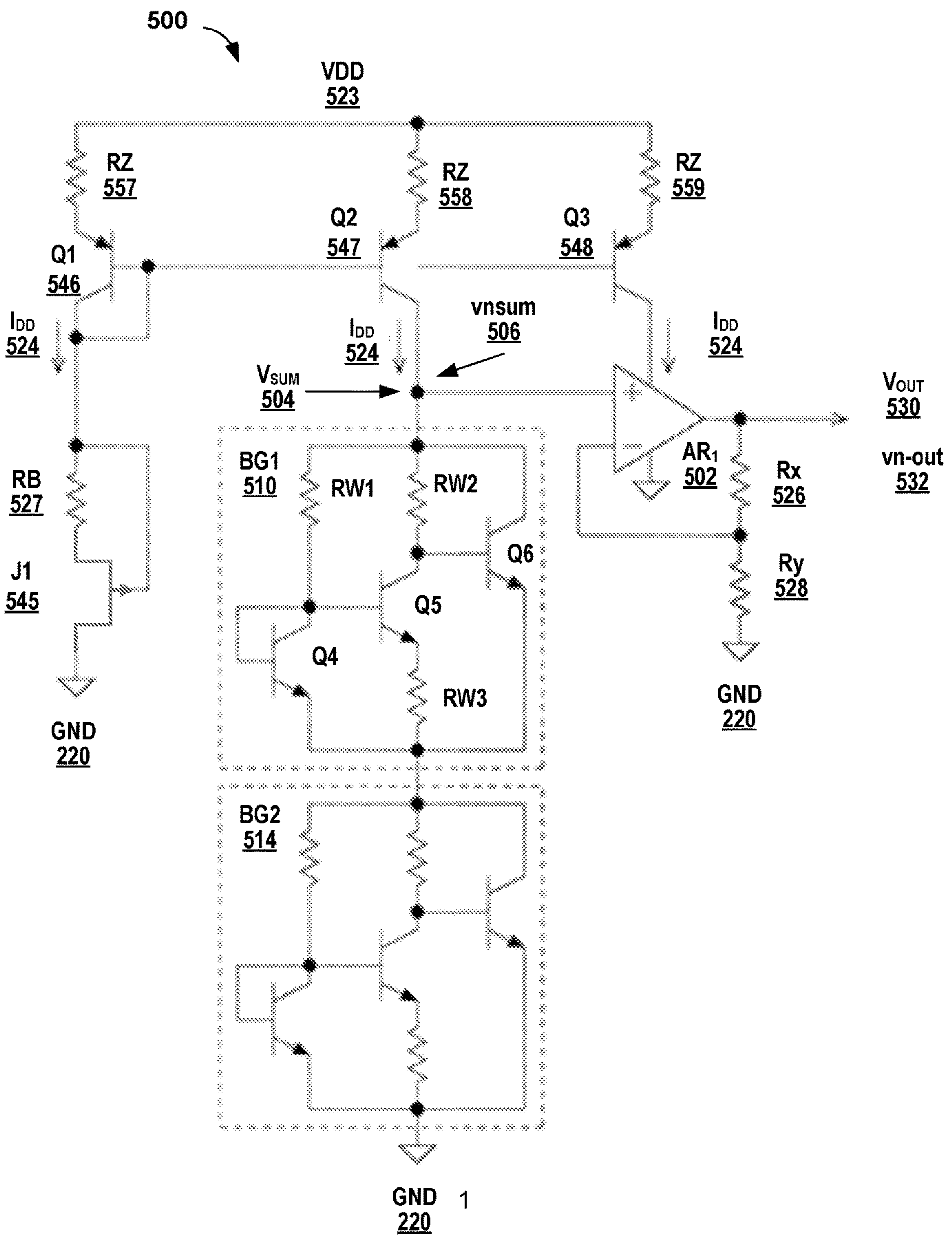
FIG. 7 is a schematic diagram of an example voltage reference circuit including an array comprising a single string of independent Widlar bandgap voltage references, according to one or more techniques of this disclosure.

FIG. 7 is a schematic diagram of an example voltage reference circuit including an array comprising a single string of independent bandgap voltage references, according to one or more techniques of this disclosure. Circuit 500 in the example of FIG. 7 uses the Widlar design as the basic bandgap cell with k=2 and m=1 so that VOUT=2*VBG. In other words, Vsum 504 is the sum of BG1 510 and BG2 514, similar to the example of circuit 100 in FIG. 3. Each of BG1 510 and BG2 514 may include an associated noise source (not shown in FIG. 7) as described above in relation to FIGS. 3-6. Selecting Rx 526 and Ry 528 so that the gain of amplifier AR1 502 is one, then Vout 530 is based on the Vsum 504, and vn-out 532 is based on the sum of the noise sources.

DC bias to BG1 510, BG2 514 and the output amplifier, AR1 502 is supplied by a junction FET, J1 545 through a set of current mirrors formed by Q1 546, Q2 547 and Q3 548. The current mirror transistors use emitter degeneration resistors, RZ 557, RZ 558 and RZ 559, to reduce noise introduced by the current mirror itself. These emitter degeneration resistors may not be needed for bipolar current mirrors; but degeneration resistors may be desirable for current mirrors using metal oxide semiconductor (MOS) transistors. Resistor RB 527 sets the bias current of the depletion mode junction field effect transistor (JFET), J1 545. In some examples J1 545 may be replaced by a metal-semiconductor field-effect transistor (MESFET).

The example arrangement of Q1 546, Q2 547, Q3 548, RB 527 and J1 545 is just one possible example arrangement. In other examples, a different type of current source circuit may supply current to Vsum 504. For example, the arrangement of Q1 546, Q2 547 and Q3 548 may be replaced by a different circuit similar to the arrangement of Rb 527 and J1 545.

Independent bandgap voltage reference BG1 510, in the example of FIG. 7, is a Widlar reference including three NPN bipolar junction transistors (BJT). The collector of Q6 connects to Vsum 504 at the non-inverting input to AR1 502. The collector of Q6 connects to the collector of Q5 through resistor RW2 and to the collector of Q4 through resistor RW1. The collector of Q5 also connects to the base of Q6. The emitter of Q6 connects to the emitter of Q4, as well as through resistor RW3 to the emitter of Q5. The base of Q4 connects to the collector of Q4 and to the base of Q5. Voltage reference BG2 514 is arranged in the same way. Idd 524 runs from Vdd 523 through the series arrangement of RZ 557 and PNP BJT Q1 546. The emitter of Q1 546 connects to VDD 523 through RZ 557. The base of Q1 546 connects to the collector of Q1 546 and to the drain-source channel of JFET J1 545 through resistor RB 527. The gate of J1 545 connects to the collector of Q1 546.

Idd 524 passes from Vdd 523 through resistor RZ 558, through PNP BJT Q2 547 and through BG1 510 and BG2 514 to GND 220. The emitter of Q2 547 connects to Vdd 523 through resistor RZ 558. The collector of Q2 547 is the Vsum 504, connected to BG1 510 and the non-inverting input of AR1 502. Idd 524 also feeds AR1 502 through resistor RZ 559, connected between VDD 523 and the emitter of Q3 548. The collector of Q3 548 connects to AR1 502.

Figure 8:
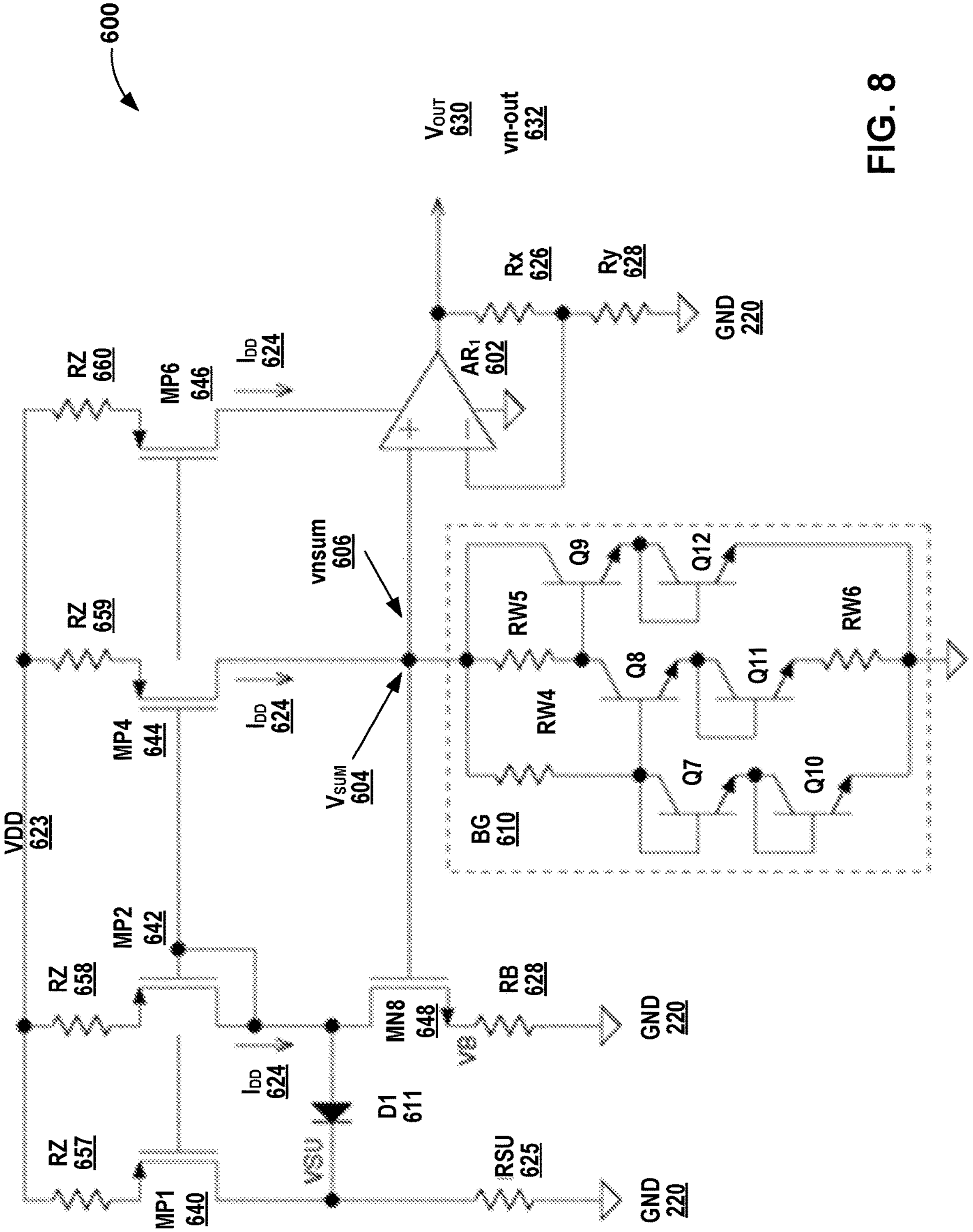
FIG. 8 is a schematic diagram of an example voltage reference circuit including an array comprising a merged arrangement of Widlar bandgap references.

FIG. 8 is a schematic diagram of an example voltage reference circuit including an array comprising a merged arrangement of Widlar bandgap references. It is possible to merge two or more series connected bandgap cells into a single cell by connecting the individual components of the bandgap cell in series. The example of circuit 600 of FIG. 8 illustrates this merged arrangement for the two Widlar bandgap reference cells of circuit 500 described above in relation to FIG. 7. Note that each resistor in bandgap cell BG 610 has twice the value compared to the resistors in bandgap cell BG1 510 and BG2 514. Both of circuits 500 and 600 shown in FIGS. 5 and 6 produce the same output voltage, VOUT=2*VBG, and output noise level, vnout=SqrRoot(2)*vn, as described above in relation to FIG. 7.

Also, when compared to circuit 500 of FIG. 7, circuit 600 illustrates an alternate arrangement for setting the bias current. In some examples, a JFET may not be available in a given process, so the resistor, RB 628 may be used by itself to set the bias current (with a higher value of RB) at the expense of reduced power supply rejection. In other examples, when JFETs are not available, the bandgap voltage itself (Vsum 604) may be used to set the bias current. Using Vsum 604 has the advantage of providing a stable bias current and good power supply rejection but may be more complex and use a start-up circuit to prevent the circuit from locking up when the circuit is in the VSUM=0 and IDD=0 state, e.g., at low temperatures. Circuit 600 illustrates the use of the constant VSUM voltage to set the bias current. Note that a diode D1 611, a resistor (RSU 625), and a third current mirror output are used to ensure that the bias circuit starts up properly. The value of RSU 625 may be much greater than the resistance value of RB 628.

Circuit 600 includes a first current mirror carrying Idd 624 with the drain-source channel of PMOS transistor P6 646 connected to AR1 602 as well as to Vdd 623 through source degeneration resistor RZ 660. The output of AR1 602 provides Vout 630, and the associated noise output vn-out 632. The output of AR1 602 connects to ground through the series arrangement of resistor divider Rx 626 and Ry 628. The inverting input of AR1 602 connects to the node between Rx 626 and Ry 628.

A second current mirror provides Idd 624 to the voltage reference circuit BG 610, with the drain-source channel of PMOS transistor P4 644 connected to BG610 as well as to Vdd 623 through source degeneration resistor RZ 659. The third current mirror provides current to start up circuit 600 with the drain-source channel of PMOS transistor MP1 640 connected to GND 220 through resistor RSU 625 as well as to Vdd 623 through source degeneration resistor RZ 657. The series arrangement of PMOS transistor MP2 642 and NMOS transistor MN8 648 connects to Vdd 623 through RZ 658 and to GND 220 through RB 628. The gate of MN8 648 connects to the Vsum 604 node. The gate of MP2 642 connects to the drains of MP2 642 and MP8 648 as well as to the gates of MP1 640, MP4 644 and MP6 646. The cathode of diode D1 connects to the drain of MP2 642 and the anode connects to the drain of MP1 640.

As described above in relation to FIG. 7, the current source circuit arrangement of MP1 640, MP2 642, MP4 644 and MP6 646 may be replaced by a different current source circuit. As one example, the arrangement of FIG. 8 may be replaced by the arrangement of Q1 546, Q2 547 and Q3 548 along with J1 545 shown in FIG. 7. In other examples, the current source may be replaced by a different circuit similar to the arrangement of Rb 527 and J1 545. Similarly, the circuit of FIG. 7 may use the current supply circuit shown in FIG. 8, or some other equivalent circuit.

Figure 9:
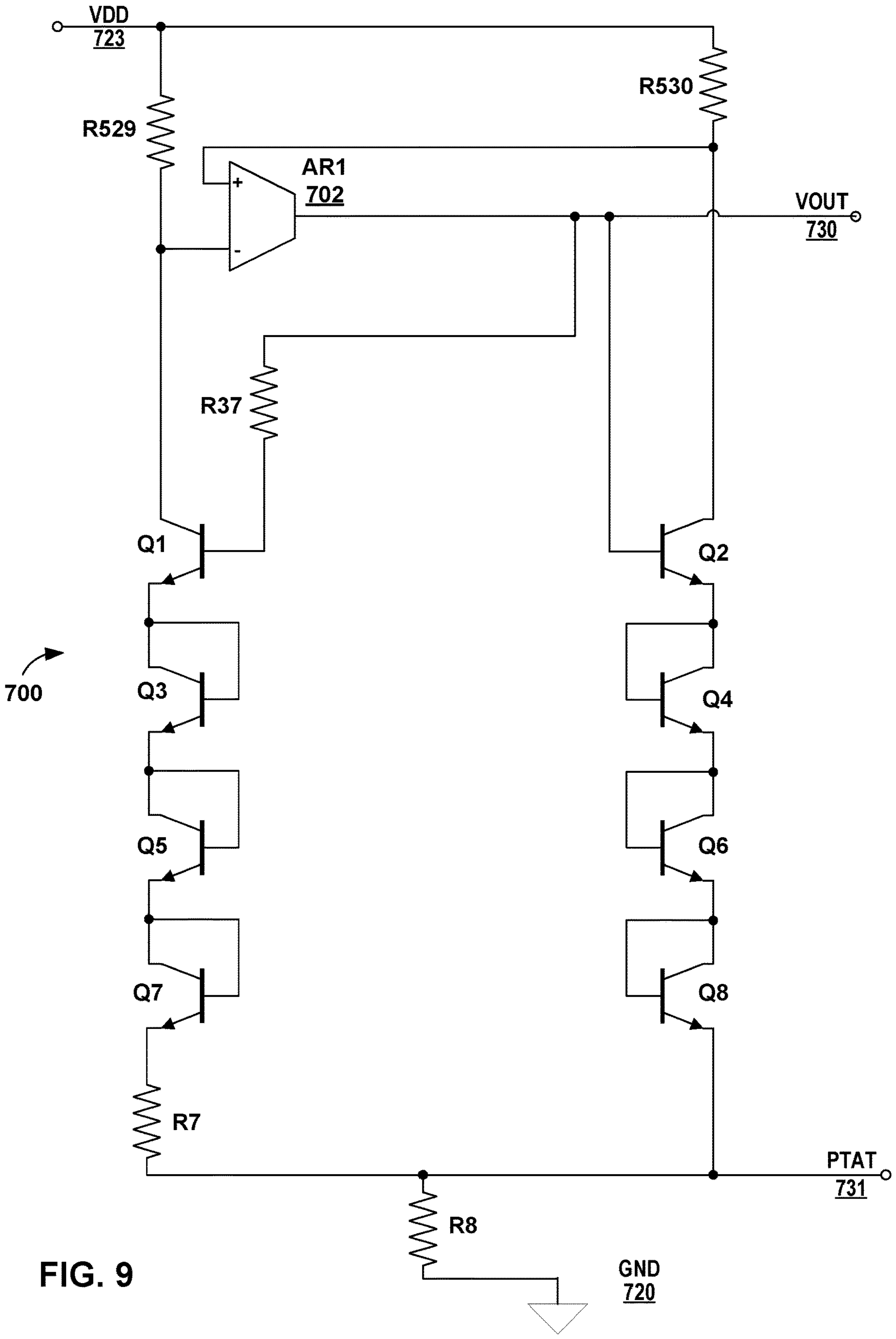
FIG. 9 is a schematic diagram illustrating an example voltage reference circuit using an array of merged Brokaw voltage references, according to one or more techniques of this disclosure.
Figure 10:
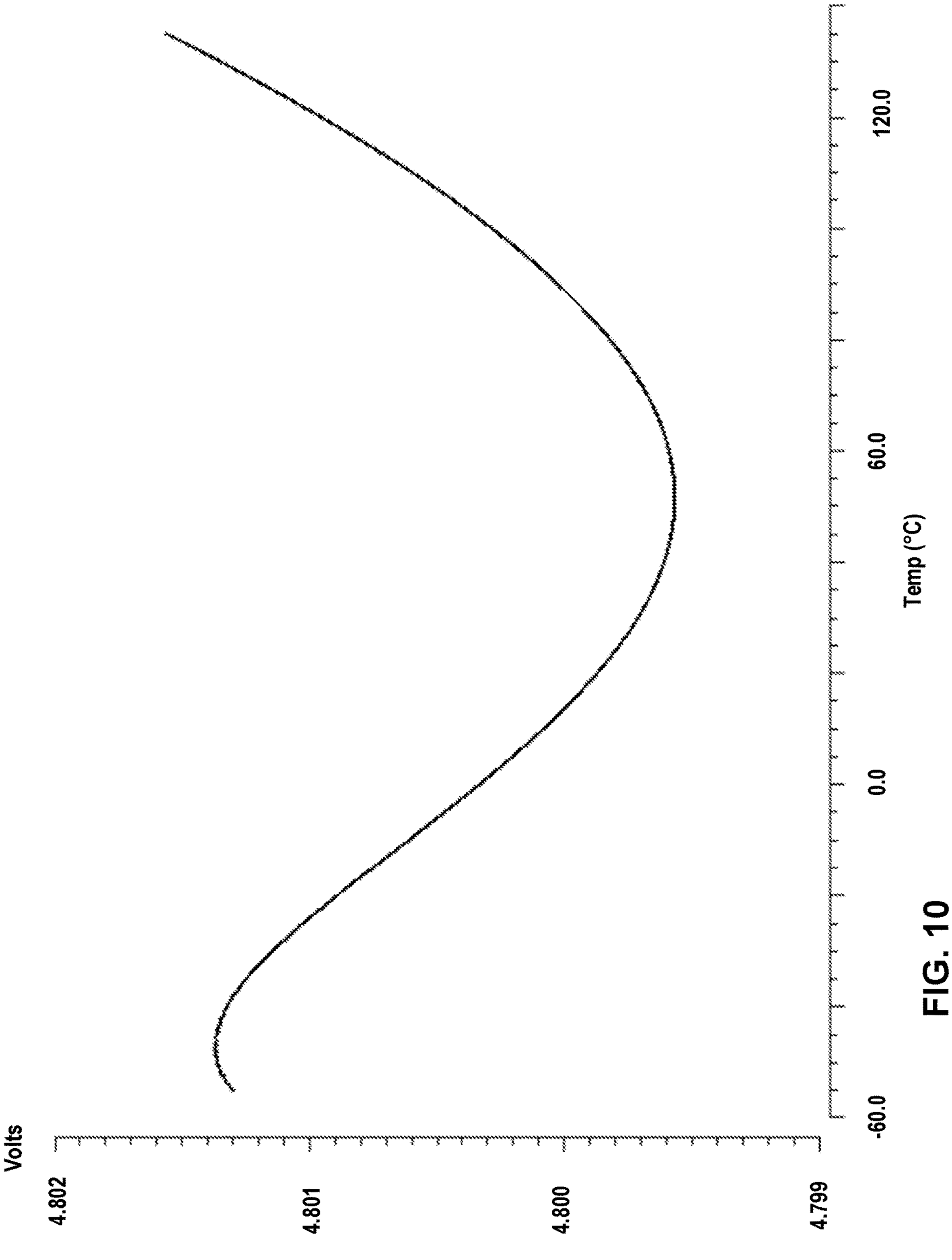
FIG. 10 is a graph of voltage versus temperature for an example bandgap reference circuit that includes an array of merged Brokaw voltage references.

FIG. 9 is a schematic diagram illustrating an example voltage reference circuit using an array of merged Brokaw voltage references, according to one or more techniques of this disclosure. In principle, any basic bandgap cell may be merged in this manner. Circuit 700 of FIG. 9 shows an example of four Brokaw cells merged together. In some examples, circuit 700 may also include a start-up circuit and a pre-regulator circuit that are outside the scope of this disclosure (not shown in FIG. 9). Q1-Q3-Q5-Q7 are low current density devices and Q2-Q4-Q6-Q8 are high current density devices. In some examples, the native output voltage of this circuit may be approximately 4.8V as shown in the trace of FIG. 10, described below. In some examples, circuit 700 may also be followed by an amplifier with a small amount of gain (not shown in FIG. 9) to provide a 5.0V DC output. Resistor R37 is on the base of transistor Q1 to provide base current compensation for curvature correction, as shown in the plot FIG. 10 below.

In more detail, Vdd 723 connects to the inverting input of AR1 702 and to the collector of NPN BJT Q1 through resistor R529. Vdd 723 also connect t through resistor R530 to the collector of NPN BJT Q2. The output of amplifier AR1 702 connects to the output Vout 730. T As with all the example circuits in this disclosure, in some examples, amplifier AR1 702 may be implemented as an operational transconductance amplifier.

The series arrangement of Q1-Q3-Q5-Q7 connect to GND 720 through resistor R7 and resistor R8. The base of Q1 connects to Vout 730 through resistor R37. The base of Q3 connects to the emitter of Q1 and collector of Q3. The base of Q5 connects to the emitter of Q3 and collector of Q5. The base of Q7 connects to the emitter of Q5 and collector of Q7. The emitter of Q7 connects to resistor R7.

The series arrangement of Q2-Q4-Q6-Q8 connects directly to the proportional to absolute temperature (PTAT) pin, PTAT 731. PTAT 731 connects to R8, as well as to the emitter of Q8. In some examples GND 720 may be a negative supply, as noted above. The base of Q2 connects to Vout 730. The base of Q4 connects to the emitter of Q2 and collector of Q4. The base of Q6 connects to the emitter of Q4 and collector of Q6. The base of Q8 connects to the emitter of Q6 and collector of Q8.

Figure 11:
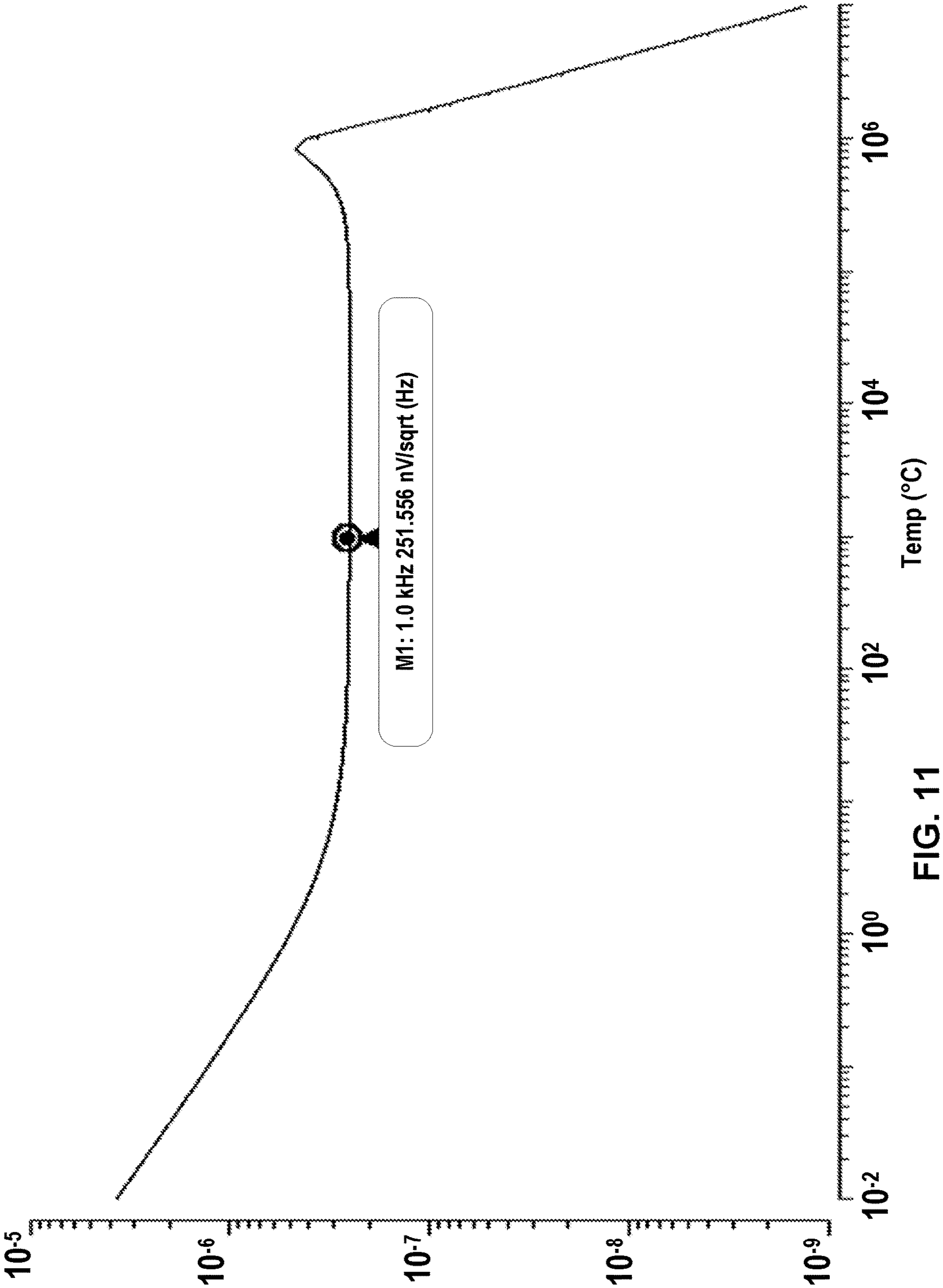
FIG. 11 is a graph depicting the output noise performance of an example voltage reference circuit that includes an array of merged Brokaw voltage references.

FIG. 10 illustrates circuit performance of the output voltage over a wide temperature range. FIG. 11 is a graph depicting the output noise performance of an example voltage reference circuit that includes an array of merged Brokaw voltage references. The performance described by the graph of FIG. 11 depict the noise performance of the example circuit 700, described above in relation to FIG. 9. The measurements for the voltage reference circuit are based on a circuit fabricated using a silicon-on-insulator (SOI) process. However, any other silicon (Si) process could also be used to implement this technique. In fact, any number of non-silicon semi-conducting materials may also be used to implement this technique.

The graph of FIG. 11 illustrates the output noise performance of circuit 700 over a frequency range. Above 100 Hz, circuit 700 may exhibit a noise density of about 250 nV/sqrt-Hz. When integrated over a 500 kHz bandwidth, noise density amounts to a noise voltage of approximately 177 μVrms. The example circuit 700 accomplished this level of noise with a total of 24 low gain NPN transistors operating at a total bias current of 120 μA occupying an area of only 162.6×98.6 μm.

The noise of this circuit is not limited by either the bandgap amplifier, AR1 702 in FIG. 9, or the output amplifier (not shown in FIG. 9). Though not shown in FIG. 11, circuit 700 may result in a noise plot that shows an output noise floor of about 30 nV/rt-Hz that occurs when resistor R8 is bypassed by an external capacitor to ground (e.g., on the PTAT 731 pin). When R8 is bypassed, the dominate source of noise is the output amplifier. Therefore, the circuit arrangement of this disclosure, described above in relation to FIGS. 3-11 may allow the full use of the available supply voltage to minimize both output noise and power consumption.

The techniques of this disclosure may also be described in the following examples.

Example 1: A circuit comprising an amplifier circuit comprising an output terminal configured to provide a voltage output; and an input terminal; a first shunt voltage reference circuit and a second shunt voltage reference circuit, wherein the first shunt voltage reference circuit includes a first low terminal and a first high terminal, wherein the second shut voltage reference circuit includes a second low terminal and second high terminal, wherein the first shunt voltage reference circuit connects in series with the second shunt voltage reference circuit such that the second high terminal connects to the first low terminal, wherein the first high terminal connects to the input terminal of the amplifier circuit.

Example 2: The circuit of example 1, wherein the first shunt voltage reference circuit is a bandgap voltage reference circuit.

Example 3: The circuit of any of examples 1 and 2, further comprising a third shunt voltage reference circuit including a third high terminal and a third low terminal, wherein the third high terminal connects to the second low terminal to connect the third shunt voltage reference circuit in series with the first shunt voltage reference circuit and the second shunt voltage reference circuit.

Example 4: The circuit of any of examples 1 through 3, further comprising a third shunt voltage reference circuit and a fourth shunt voltage reference circuit, wherein the third shunt voltage reference circuit includes a third low terminal and a third high terminal, wherein the fourth shut voltage reference circuit includes a fourth low terminal and fourth high terminal, wherein the first shunt voltage reference circuit and the second shunt voltage reference circuit comprise a first string of series connected voltage reference circuits, wherein the third shunt voltage reference circuit connects in series with the fourth shunt voltage reference circuit such that the fourth high terminal connects to the third low terminal, to form a second string of series connected voltage reference circuits; wherein the third high terminal connects to the input terminal of the amplifier to form an array of parallel connected strings voltage reference circuits.

Example 5: The circuit of example 4, wherein each respective shunt voltage reference circuit has a voltage drop across each respective low terminal and high terminal, and wherein each of the respective voltage drops are approximately equal in magnitude.

Example 6: The circuit of any of examples 4 and 5, wherein the first high terminal connects to the input terminal through a resistor.

Example 7. The circuit of example 4, further comprising an amplifier feedback circuit including a resistor divider, wherein the voltage output from the output terminal of the amplifier circuit provides a reference voltage output, wherein the amplifier circuit comprises a second input terminal for an inverting input, and wherein a node between resistors of the resistor divider connects to the second input terminal.

Example 8. The circuit of example 4, further comprising: an amplifier feedback circuit configured for unity gain; and a resistor divider connected to the output terminal of the amplifier circuit, wherein a node between resistors of the resistor divider provides a reference voltage output.

Example 9. The circuit of example 4, further comprising: an amplifier feedback circuit configured for unity gain; and a resistor divider, wherein a node between resistors of the resistor divider connects to the input terminal.

Example 10: The circuit of any of examples 1 through 10, further comprising an amplifier feedback circuit including a resistor divider, wherein the voltage output from the output terminal of the amplifier circuit provides a reference voltage output, wherein the amplifier circuit comprises a second input terminal for an inverting input, and wherein a node between resistors of the resistor divider connects to the second input terminal.

Example 11: The circuit of any of examples 1 through 11, further comprising an amplifier feedback circuit configured for unity gain; and a resistor divider connected to the output terminal of the amplifier circuit, and wherein a node between resistors of the resistor divider provides a reference voltage output.

Example 12: The circuit of any of examples 1 through 12, further comprising an amplifier feedback circuit configured for unity gain; and a resistor divider, and wherein a node between resistors of the resistor divider connects to the input terminal.

Example 13: The circuit of any of examples 4 through 12, wherein the array of parallel connected strings voltage reference circuits are arranged as merged voltage reference circuits.

Various examples of the disclosure have been described. These and other examples are within the scope of the following claims.

What is claimed is:

1. A circuit comprising:

an amplifier circuit comprising:
- an output terminal configured to provide a voltage output; and
- an input terminal;

a first shunt voltage reference circuit and a second shunt voltage reference circuit,
- wherein the first shunt voltage reference circuit is a bandgap voltage reference circuit,
- wherein the first shunt voltage reference circuit includes a first low terminal and a first high terminal,
- wherein the second shunt voltage reference circuit includes a second low terminal and second high terminal,
- wherein the first shunt voltage reference circuit connects in series with the second shunt voltage reference circuit such that the second high terminal provides a positive voltage and connects to the first low terminal,
- wherein the first high terminal connects to the input terminal of the amplifier circuit to provide a positive summed voltage from the first shunt voltage reference circuit and the second shunt voltage reference circuit,
- wherein the circuit further comprises a third shunt voltage reference circuit and a fourth shunt voltage reference circuit,
- wherein the third shunt voltage reference circuit includes a third low terminal and a third high terminal,
- wherein the fourth shunt voltage reference circuit includes a fourth low terminal and fourth high terminal,
- wherein the first shunt voltage reference circuit and the second shunt voltage reference circuit comprise a first string of series connected voltage reference circuits,
- wherein the third shunt voltage reference circuit connects in series with the fourth shunt voltage reference circuit such that the fourth high terminal connects to the third low terminal, to form a second string of series connected voltage reference circuits, and
- wherein the third high terminal provides the positive summed voltage from the first shunt voltage reference circuit and the second shunt voltage reference circuit and connects to the input terminal of the amplifier circuit to form an array of parallel connected strings of voltage reference circuits.

2. The circuit of claim 1, further comprising a fifth shunt voltage reference circuit including a fifth high terminal and a fifth low terminal, wherein the fifth high terminal connects to the second low terminal to connect the fifth shunt voltage reference circuit in series with the first shunt voltage reference circuit and the second shunt voltage reference circuit.

3. The circuit of claim 1, wherein the first high terminal connects to the input terminal through a resistor.

4. The circuit of claim 1,
- wherein each respective shunt voltage reference circuit has a voltage drop across each respective low terminal and high terminal, and
- wherein each of the respective voltage drops are approximately equal in magnitude.

5. The circuit of claim 1, further comprising an amplifier feedback circuit including a resistor divider,
- wherein the voltage output from the output terminal of the amplifier circuit provides a reference voltage output,
- wherein the amplifier circuit comprises a second input terminal for an inverting input, and
- wherein a node between resistors of the resistor divider connects to the second input terminal.

6. The circuit of claim 1, further comprising:
- an amplifier feedback circuit configured for unity gain; and
- a resistor divider connected to the output terminal of the amplifier circuit,
- wherein a node between resistors of the resistor divider provides a reference voltage output.

7. The circuit of claim 1, further comprising:

an amplifier feedback circuit configured for unity gain; and a resistor divider, wherein a node between resistors of the resistor divider connects to the input terminal.

8. The circuit of claim 1, further comprising an amplifier feedback circuit including a resistor divider, wherein the voltage output from the output terminal of the amplifier circuit provides a reference voltage output, wherein the amplifier circuit comprises a second input terminal for an inverting input, and wherein a node between resistors of the resistor divider connects to the second input terminal.

9. The circuit of claim 1, further comprising:

an amplifier feedback circuit configured for unity gain; and a resistor divider connected to the output terminal of the amplifier circuit, wherein a node between resistors of the resistor divider provides a reference voltage output.

10. The circuit of claim 1, further comprising:

an amplifier feedback circuit configured for unity gain; and a resistor divider, wherein a node between resistors of the resistor divider connects to the input terminal.

* * * * *